United States Patent [19]

Hasegawa et al.

[11] Patent Number: 4,828,084

[45] Date of Patent: May 9, 1989

[54] CONTROL CIRCUIT FOR FLUID COUPLING WITH HIGH-GEAR CLUTCH

[75] Inventors: Hiromi Hasegawa, Obu; Toshiaki Ishiguro, Nagoya, both of Japan

[73] Assignee: Aisin Seiki Kabushiki Kaisha, Kariya, Japan

[21] Appl. No.: 19,114

[22] Filed: Feb. 26, 1987

[30] Foreign Application Priority Data

Feb. 27, 1986 [JP] Japan .................................. 61-42168

[51] Int. Cl.⁴ ............................................ F16H 45/02
[52] U.S. Cl. ...................................... 192/3.3; 192/3.29
[58] Field of Search ................... 192/3.21, 3.28, 3.29, 192/3.3, 3.33

[56] References Cited

U.S. PATENT DOCUMENTS

| | | | |
|---|---|---|---|
| 2,736,412 | 2/1956 | Livezy | 192/3.3 X |
| 2,834,632 | 9/1958 | Lucia et al. | 192/3.3 |
| 3,241,399 | 3/1966 | Fisher et al. | 192/3.3 X |
| 3,252,352 | 5/1966 | General et al. | 74/645 |
| 4,271,939 | 6/1981 | Iwanaga et al. | 192/3.3 |

FOREIGN PATENT DOCUMENTS 55-109853  8/1980  Japan .
58-121352  7/1983  Japan .
60-30864   2/1985  Japan .
60-30863   2/1985  Japan .

*Primary Examiner*—Rodney H. Bonck
*Assistant Examiner*—Richard M. Lorence
*Attorney, Agent, or Firm*—Burns, Doane, Swecker & Mathis

[57] ABSTRACT

A control circuit for a fluid coupling device with a high-gear clutch. The fluid coupling device includes a power chamber into which a working fluid is introduced for performing a transmission action, a clutch member arranged for connecting and disconnecting the input and output elements, a working chamber formed separately of the power chamber and a piston member forcibly displaced by a pressure differential between the working chamber and the power chamber for engaging or disengaging the clutch member. A fluid pressure source supplies working fluid to the interior of the power chamber and a high-gear clutch control valve supplies fluid to and discharges fluid from the working chamber for controlling the engagement and disengagement of the clutch. A control device, responsive to the supply and discharge of the working fluid to and from the working chamber by the high-gear clutch control unit, reduces a pressure internally of the power chamber to a hydraulic pressure proportionally to a throttle pressure from a throttle valve.

10 Claims, 4 Drawing Sheets

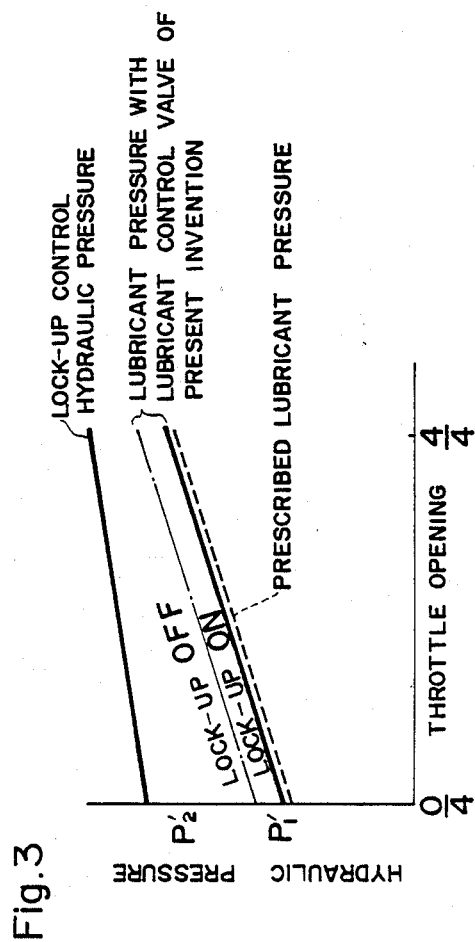
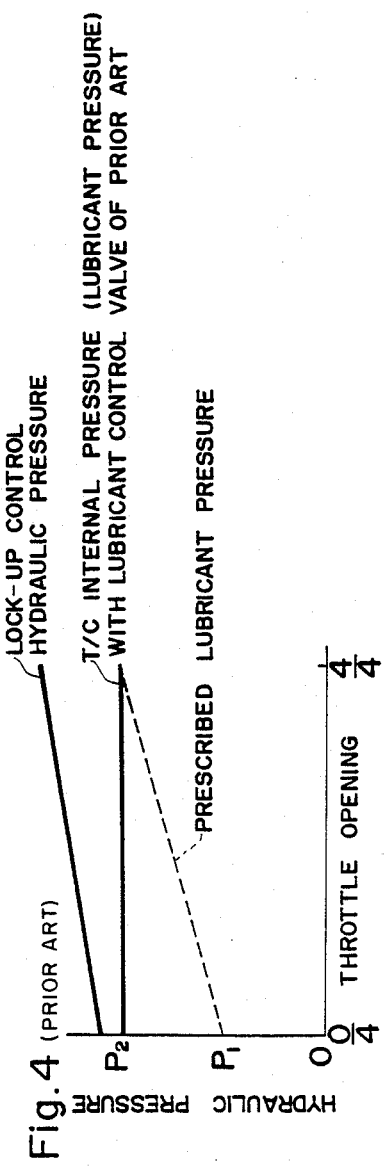

CONTROL CIRCUIT FOR FLUID COUPLING WITH HIGH-GEAR CLUTCH

BACKGROUND OF THE INVENTION

This invention relates to a control circuit for a fluid coupling means with a high-gear (direct coupling) clutch capable of being utilized in a torque converter equipped with a high-gear clutch for automatic transmissions.

A conventional control circuit for a fluid coupling equipped with a high-gear clutch is disclosed in the specification of Japanese Patent Kokai Publication No. 60-30864. The control circuit comprises a fluid coupling having a power chamber into which a working fluid is introduced for performing a transmission action between an input element and output element via the fluid, a clutch member arranged for the purpose of connecting and disconnecting the input and output elements as required, a working chamber formed separately of the power chamber, and a piston member forcibly displaced by a pressure differential between the working chamber and power chamber for engaging or disengaging the clutch member; a fluid pressure source provided in order to supply the working fluid to the interior of the power chamber of the fluid coupling; a high-gear clutch control unit which supplies fluid to or discharges the fluid from the working chamber for controlling the connection and disconnection of the clutch; and control means responsive to the supply and discharge of the fluid to and from the working chamber by the high-gear clutch control unit to reduce the pressure internally of the power chamber supplied from the fluid pressure source, thereby enlarging the pressure differential between the working chamber and power chamber.

In other words, in response to operation of the high-gear clutch, the pressure within the torque converter is reduced to enlarge the pressure differential between the high-gear clutch hydraulic pressure and the torque converter hydraulic pressure. The pressure internally of the torque converter is so regulated by a lubricant control valve as to assume a constant value, and lubricant pressure also is regulated simultaneously so as to be constant. Since the lubricating pressure in this case must be regulated to assume a value capable of assuring a prescribed amount of lubricant flow at full throttle, the amount of lubricant that flows at low throttle is greater than the optimum amount, as shown in FIG. 4, the disadvantageous result of which is an increase in oil pump loss.

Similarly, the pressure inside the torque converter at low throttle rises above the optimum pressure. Therefore, in order to obtain a pressure differential of a prescribed magnitude between the high-gear clutch hydraulic pressure and the torque converter pressure, the high-gear clutch hydraulic pressure must be made high. This has an adverse influence upon oil pump efficiency.

SUMMARY OF THE DISCLOSURE

An object of the present invention is to provide a control circuit for a fluid coupling with a high-gear clutch capable of reducing oil pump loss at low throttle.

Another object of the present invention is to provide a control circuit for a fluid coupling with a high-gear clutch in which oil pump efficiency is not adversely affected.

A further object of the present invention is to provide a control circuit for a fluid coupling with a high-gear clutch in which the clutch piston can be reduced in weight to lighten the weight of the overall automatic transmission.

According to the present invention, the foregoing objects are attained by providing a control circuit for a fluid coupling with a high-gear clutch comprising a fluid coupling having a power chamber into which a working fluid is introduced for performing a transmission action between an input element and output element via the fluid, a clutch member arranged for the purpose of connecting and disconnecting the input and output elements as required, a working chamber formed separately of the power chamber, and a piston member forcibly displaced by a pressure differential between the working chamber and power chamber for engaging and disengaging the clutch member; a fluid pressure source provided in order to supply the working fluid to the interior of the power chamber of the fluid coupling; a high-gear clutch control unit which supplies fluid to and discharges the fluid from the working chamber for controlling the engagement and disengagement of the clutch; and control means responsive to the supply (and discharge) of the fluid to (and from the working chamber) by the high-gear clutch control unit to, upon said supply, reduce the pressure $P_{t/c}$ internally of the power chamber, which is supplied from the fluid pressure source, down to a hydraulic pressure conforming to a hydraulic pressure from a throttle valve.

The control means responsive to the supply of the fluid to the working chamber may comprise a secondary regulator valve or a specific lubricant control valve.

The control means includes a secondary regulator valve which regulates lubricant and the power chamber pressure $P_{t/c}$ in response to the throttle valve pressure.

The secondary regulator valve includes a valve element which is actuated by the throttle valve pressure $P_{th}$ and a thereto opposing pressure which is responsive to the working chamber fluid.

Namely the secondary regulator valve includes a spool having a plurality of lands, a chamber communicating with the power chamber, a port communicating with a pressure regulating output port of a primary regulator valve, an oil chamber at one end for introducing throttle pressure, and an oil chamber at the other end communicating with the working chamber, a spring for urging the spool toward the oil chamber communicating with the working chamber being arranged between the two oil chambers. Pressure $P_{t/c}$ internally of the power chamber is regulated in dependence upon throttle pressure acting upon the spool, spring urging force and pressure $P_{t/c}$ internally of the working chamber.

The control circuit includes a connecting line which communicates the working chamber to a chamber in the secondary regulator valve receiving the opposing pressure responsive to the fluid supply to the working chamber.

The control means may include a lubricant control valve provided in a lubricant line connected to said power chamber of the fluid coupling means, said lubricant control valve including:

an inlet port for the pressure responsive to the working chamber fluid, an exhaust port, a spring-backed spool having a regulating land to cooperate with said exhaust port, a chamber receiving the throttle valve pressure and acting on said spool, and a chamber receiving pressure of the lubricant and acting on said spool to counteract the throttle valve pressure, thereby regulating said pressure chamber fluid in response to the throttle valve pressure and the lubricant pressure.

In accordance with the invention as set forth above, the pressure in the fluid coupling means (torque converter), the high-gear clutch hydraulic pressure and the lubrication pressure can all be so controlled as to attain their optimum values. This has the effect of reducing oil pump loss and the amount of fuel consumed by the vehicle. In addition, the high-gear clutch pressure is brought to its optimum valve without being raised more than necessary. A high-gear clutch piston with great rigidity therefore is not required. This makes it possible to reduce the weight of the high-gear clutch piston, thereby enabling a reduction in the weight of the automatic transmission.

BRIEF DESCRIPTION OF THE DRAWINGS

FIG. 3 is a diagram showing the relationship between throttle opening and internal pressure in accordance with the invention;

FIG. 4 is a diagram showing the relationship between throttle opening and internal pressure in accordance with the prior art.

DESCRIPTION OF THE PREFERRED EMBODIMENTS

Figure 1:
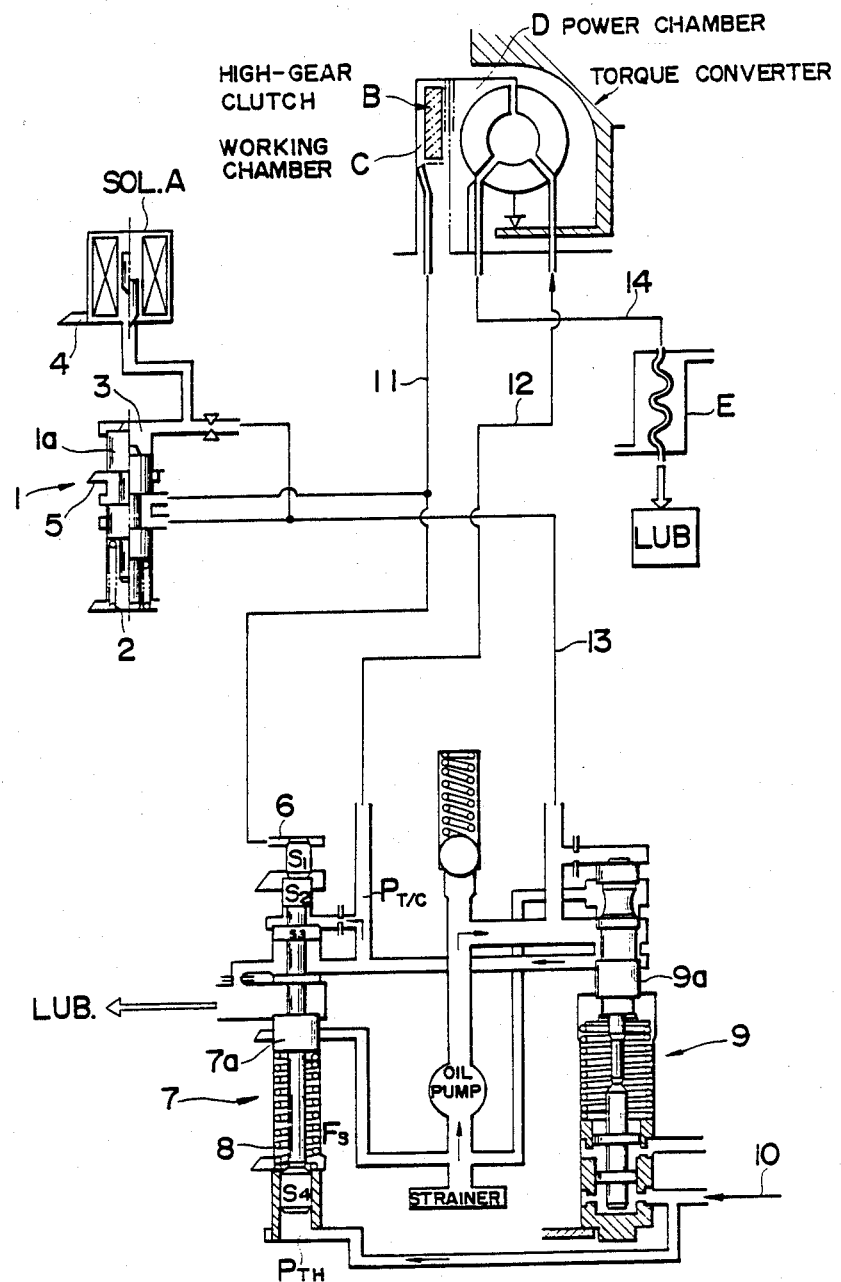
FIG. 1 is a circuit diagram illustrating an embodiment of a control circuit for a fluid coupling equipped with a high-gear clutch in accordance with the present invention.

With reference to FIG. 1, there is shown a control circuit in accordance with the present invention including a high-gear clutch control valve 1, a spring 2, an oil chamber 3, oil lines 4, 5 for discharge, an oil chamber 6, a secondary regulator valve 7, a spring 8, a primary regulator valve 9, and oil lines 10, 11, 12, 13, 14.

The primary regulator valve may include a spool having a plurality of lands, an input port communicating with the fluid pressure source, a pressure regulating output port communicating with the power chamber, an oil chamber at one end for introducing throttle pressure, and an oil chamber at the other end communicating with the regulated pressure of the primary regulator valve, a spring for urging the spool in the same direction with the throttle pressure being arranged between the two oil chambers. Pressure supplied by the fluid pressure source is regulated in dependence upon throttle pressure acting upon the spool, spring urging force and a regulated pressure of the primary regulator valve.

The fluid pressure source may be a pressure from a primary regulator valve and the high-gear clutch control unit includes a high-gear clutch control valve actuatable by a solenoid valve.

The high-gear clutch control valve includes a spool having a plurality of lands, a port communicating with the fluid pressure source, a port communicating with the working chamber, a drain port, a spring arranged at one end of the valve, a solenoid valve arranged at the other end of the valve, and an oil chamber communicating with the fluid pressure source. The ports are opened and closed by the lands of the spool in dependence upon energization and deenergization of the solenoid valve, thereby engaging and disengaging the high-gear clutch.

When the solenoid valve is in the deenergized state, the hydraulic pressure in the oil chamber is discharged from an exhaust port so that the high-gear clutch control valve element is raised, thereby discharging the high-gear clutch control pressure in an associated oil chamber through an oil line to release the high-gear clutch.

When the solenoid valve is energized, the high-gear clutch control valve element is urged downward by the hydraulic pressure in the oil chamber, so that the regulated hydraulic pressure is supplied to the oil chamber associated with the high-gear clutch to engage the same.

When a solenoid valve A is in the deenergized state, hydraulic pressure in the oil chamber 3 is discharged from the exhaust line 4 so that the high-gear clutch control valve 1 is urged upwardly (as indicated by the left side in FIG. 1) by the spring 2, thereby discharging hydraulic pressure (high-gear clutch control pressure) in a working chamber C through the oil line 11 and out the oil line 5 to release a high-gear clutch B. The pressure inside the torque converter (power chamber) D is controlled to a hydraulic pressure supplied from the oil line 12, namely a hydraulic pressure regulated by the secondary regulator valve 7. Since no hydraulic pressure is produced in the oil chamber 6, the hydraulic pressure at this time is one which conforms to the resultant of the load of spring 8 and the throttle pressure supplied from the oil line 10. This hydraulic pressure is expressed by the following:

$$P_{t/c} = \frac{P_{th} \cdot S_4 + F_S}{S_3 - S_2} \quad (1)$$

When the solenoid valve A is energized, hydraulic pressure is produced in the oil chamber 3, so that a spool 1a of the high-gear clutch control valve 1 is urged downwardly (as indicated by the right side in FIG. 1) against the force of spring 2. The hydraulic pressure regulated by the primary regulator valve 9 is supplied to the oil chamber C via the oil lines 13, 11 to engage the high-gear clutch B. Since hydraulic pressure is supplied to the oil chamber 6 from the oil line 11, hydraulic pressure regulated by the secondary regulator valve 7 takes on the following value:

$$P_{t/c} = \frac{P_{th} \cdot S_4 + F_S}{S_3 - S_2} - \frac{P_{t/c} \cdot S1}{S_3 - S_2} \quad (2)$$

Eqs. (1) and (2) show that the internal pressure of the torque converter D varies depending upon the throttle pressure $P_{th}$, and Eq. (2) shows that the internal pressure $P_{t/c}$ drops in dependence upon the high-gear clutch control pressure. The resultant lubricant pressure change is shown in FIG. 3.

Figure 2:
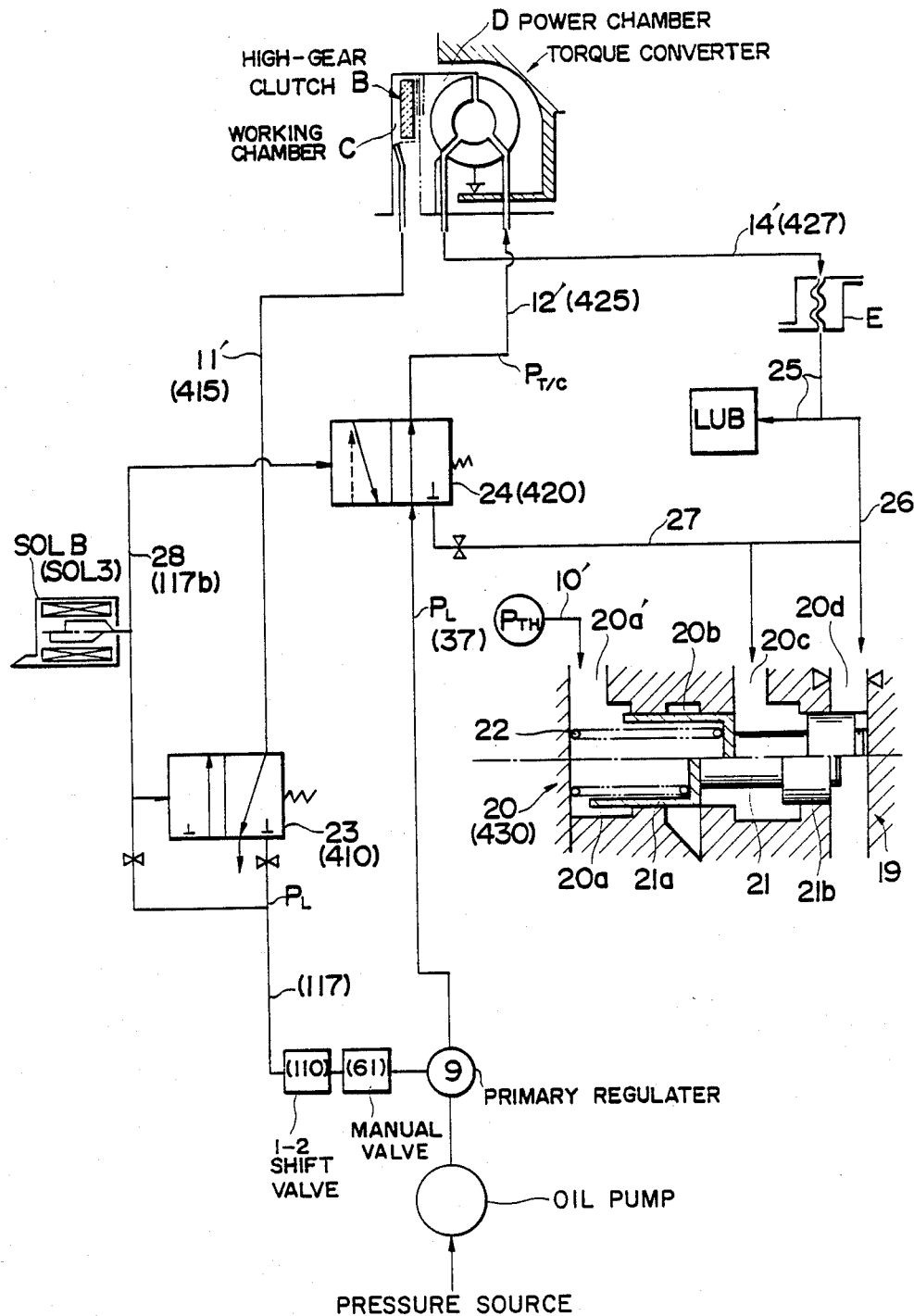
FIG. 2 is a sectional view showing the details of a lubricant control valve illustrative of another embodiment of the invention.

FIG. 2 illustrates a lubricant control valve 19 in accordance with another embodiment. The valve 19 comprises a valve body 20 having ports 20a–20d, a spool 21 formed in the body 20 and fitted slidably and hermetically in the valve bore, the spool 21 having lands 21a, 21b of the same diameter, and a spring 22 adapted to urge the spool 21 to the right. A port 20c communicates with the power chamber D of the torque converter on the one hand via a flow passageway 27, 12' having a restriction (via a torque converter control valve 24) and on the other hand via a line 14', cooler E and lines 25 and 26. The throttle pressure $P_{th}$ is introduced to a port 20a' from the output port of a throttle valve, not shown, via a line 10'. The line 25 communicates to Lubricating portions (Lub) in the transmission.

On the other hand the port 20c is communicatable with the power chamber D of the torque converter via a line 12', a torque converter control valve 24 and a line 27 which also communicates with the port 20d. The torque converter control valve 24 communicates by a restricted flow the line pressure $P_L$ to the power chamber D and thereupon communicates the power chamber D with the port 20c when SOLB is energized (i.e., the high-gear clutch B is actuated).

The working chamber C of the high-gear clutch B is communicatable with the line pressure $P_L$ via a high-gear clutch control valve 23 which is actuated by a solenoid valve B. Depending upon the solenoid valve B being energized or deenergized, the working chamber C is communicated or discommunicated with the line pressure $P_L$. As shown in FIG. 2, the solenoid valve SOLB simultaneously acts on both control valves 23 and 24.

The lubricant control valve 19 may be installed in a conventional control circuit for a fluid coupling equipped with a high-gear clutch as disclosed in, e.g., Japanese Patent Kokai Publication No. 60-30864, by replacing the conventional lubricant control valve 430 (FIG. 1B or FIGS. 2-5). The detailed disclosure of the JP-Patent Kokai No. 60-30864 relating to the lubricant control valve 430, a torque converter control valve 420, and a high-gear clutch control valve 410 with a solenoid valve SOL3 describes the following arrangement. The high-gear clutch control valve 410 includes a valve body which has a plurality of ports and a valve including lands located within a bore in the body. The lands are slidably mounted within the bore and the valve is spring loaded so as to be biased in a particular direction. One of the ports in the body of the high-gear clutch control valve 410 is connected to a high-gear clutch via a fluid line. Another one of the ports in the body is connected to a port associated with the torque converter control valve 420 and is also connected to a first fluid line via an orifice. The solenoid valve SOL3 is provided in a second fluid line which branches from the first fluid line and the solenoid valve SOL3 discharges a pressure contained in the first and second fluid lines.

The torque converter control valve 420 comprises a valve body having a plurality of ports and a valve including lands sealably and slidably mounted, within a bore defined in the body. The valve is spring loaded so as to bias the valve in a particular direction. The torque converter control valve 420 and the high-gear clutch control valve 410 are activated by the solenoid valve SOL3. When the solenoid is off, a port in each of the control valves 410, 420 discharges pressure which acts on the valves located in the control valve bodies. When the solenoid is on, pressurized oil is exerted on the ends of the valves so as to move them against the force of the respective springs.

The lubricated control valve 430 comprises a valve body having a plurality of ports and a valve including lands slidably mounted, in seal, within a bore defined in the valve body. The valve is spring loaded within the bore so as to bias the valve in a particular direction. A port in the body is connected, via an orifice, to a fluid line which is in turn connected to the torque converter.

Figure 5:
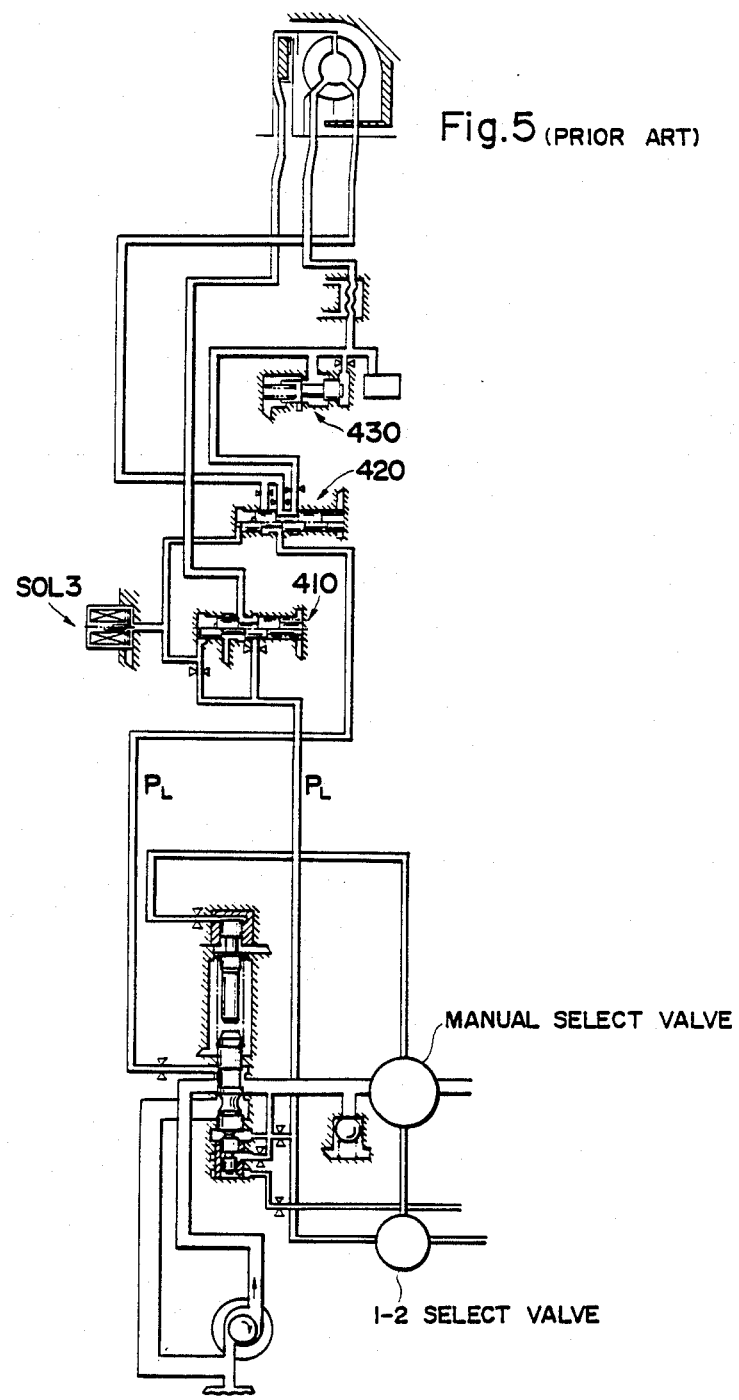
FIG. 5 is a circuit diagram showing a conventional control circuit.

FIG. 5 discloses one prior art embodiment corresponding to FIG. 1 of JP-Patent Kokai No. 60-30864, wherein the pressure differential between the working chamber of the clutch and the pressure chamber of the torque converter is controlled by the clutch control valve 410 with SOL3 and the torque converter control valve 420. By this provision, the pressure difference is increased when the clutch is actuated, while by substituting the inventive lubricant control valve 19 for the conventional one 430 the lubricant pressure can be further controlled as shown in FIG. 3.

The reference numerals shown in FIG. 2 in the parentheses represent those disclosed in the JP-Kokai No. 60-30864. So far as the arrangements of the control valves (410, 420, SOL3) for the lock-up clutch and the torque converter are concerned, the arrangements as shown in FIGS. 2-5 of said JP-Kokai can be also utilized in conjunction with the inventive lubricant control valve 19.

The working fluid which has filled the torque converter is supplied to the portions of the transmission requiring lubrication (Lub) via the aforementioned flow passageway 25. When the amount of flowing fluid becomes large or the resistance of the flow path (25) leading to the portions requiring lubrication becomes large, the pressure acting upon the right end face (port 20d) of spool 21 in the lubricant control valve 19 increases, so that the spool 21 is moved leftward, as indicated by the lower side in FIG. 2, whereby the land 21a allows the port 20c to communicate with a drain port 20b. This permits the pressure to be discharged so that there is a reduction in the pressure acting upon the spool 21. As a result, the spool 21 is urged rightward by the force of spring 22, whereby the port 20c and port 20b are cut off from each other. This increases the pressure acting upon the spool 21. This operation is repeated to regulate, to a variable value within a prescribed range, the fluid pressure in the flow passageway leading to the torque converter.

When the throttle opening is made 0/4, no hydraulic pressure is developed in the port 20a' because the throttle pressure is zero. Therefore, the spool 21 moves leftwards as described above and a hydraulic pressure shown at $P_1'$ in FIG. 3 is produced. More specifically, letting A represent the area of the land 21b of spool 21 and letting $F_S'$ represent the load of the spring 22, the hydraulic pressure P developed at the port 20c is expressed as follows:

$$P = \frac{F_S'}{A}$$

When the throttle opening takes on a large value, the throttle pressure is introduced to the port 20a'. Therefore, letting $P_{th}$ represent the throttle pressure and A' the area of land 21a, the hydraulic pressure P' developed at the port 20c is expressed as follows:

$$P' = \frac{F_S' + A' P_{th}}{A}$$

Thus, the drawbacks of the prior art set forth above can be eliminated by substituting the lubricant control valve 19 for the lubricant control valve (430) in the above-described conventional fluid control circuit of a fluid coupling equipped with a high-gear clutch which is, e.g., disclosed in JP Patent Kokai Publication No. 60-30864.

As many apparently widely different embodiments of the present invention can be made without departing from the spirit and scope thereof, it is to be understood that the invention is not limited to the specific embodiments thereof except as defined in the appended claims.

What we claim is:

1. A control circuit for a fluid coupling means with a high-gear clutch, comprising:
    a fluid coupling means having a power chamber into which a working fluid is introduced for performing a transmission action between an input element and output element via the working fluid, a high-gear clutch arranged for the purpose of connecting and disconnecting the input and output elements, a working chamber formed separately of the power chamber, and a piston member forcibly displaced by a pressure differential between the working chamber and power chamber for engaging or disengaging the high-gear clutch;
    a fluid pressure source provided in order to supply the working fluid to the interior of the power chamber;
    a high-gear clutch control unit which supplies the working fluid to and discharges the fluid from the working chamber for controlling the engagement and disengagement of the high-gear clutch; and
    control means, responsive to the supply and discharge of the working fluid to and from the working chamber by said high-gear clutch control unit, for reducing, upon the supply of the working fluid to the working chamber, a pressure $P_{t/c}$ internally of the power chamber which is supplied from the fluid pressure source in response to a decreased throttle pressure $P_{th}$ from a throttle valve.

2. The control circuit according to claim 1, wherein said control means responsive to the fluid supply to the working chamber includes a secondary regulator valve which regulates a lubrication pressure of lubricant flowing out of the fluid coupling means and the power chamber pressure $P_{t/c}$ proportionally to the throttle pressure $P_{th}$.

3. The control circuit according to claim 2, wherein; said secondary regulator valve includes a valve element which is actuated by the throttle pressure $P_{th}$ and a thereto opposing pressure which is responsive to the working chamber fluid.

4. The control circuit according to claim 3, which further includes a connecting line which communicates said working chamber to a chamber in the secondary regulator valve receiving said opposing pressure responsive to the fluid supply to the working chamber.

5. The control circuit according to claim 3, wherein said secondary regulator valve includes a spool having a plurality of lands, a chamber communicating with the power chamber, a pressure-regulating output port communicating with the power chamber and a pressure regulating output port of a primary regulator valve, an oil chamber at one end for introducing the throttle pressure $P_{th}$, and an oil chamber at the other end communicating with the working chamber, a spring for urging said spool toward the oil chamber communicating with said working chamber being arranged between said two oil chambers, and wherein the power chamber pressure $P_{t/c}$ is regulated in dependence upon the throttle pressure $P_{th}$ acting upon said spool, said spring and the working chamber pressure.

6. The control circuit according to claim 1, wherein said control means includes a lubricant control valve which includes a valve element actuated by the throttle pressure $P_{th}$ and a thereto opposing pressure which is responsive to pressure of the lubricant.

7. The control circuit according to claim 6, wherein said control means includes the lubricant control valve provided in a lubricant line connected to said power chamber of the fluid coupling means, said lubricant control valve including:
    an inlet port for receiving a pressure responsive to the working chamber fluid,
    an exhaust port,
    a spring-backed spool having a regulating land to cooperate with said exhaust port,
    a chamber receiving the throttle valve pressure and acting on said spool, and
    a chamber receiving the pressure of the lubricant and acting on said spool to counteract the throttle valve pressure,
    thereby regulating said power chamber fluid in response to the throttle valve pressure and the lubricant pressure.

8. The control circuit according to claim 7, wherein said control means further includes a fluid coupling means control valve which operates responsive to the action of the high-gear clutch control unit and which communicates the pressure source by means of a restricted flow to the power chamber when the highgear clutch control unit supplies the working fluid to the working chamber.

9. The control circuit according to claim 2, wherein the control means further includes a primary regulator valve regulating a fluid from the pressure source
    in response to the throttle pressure and supplying the regulated fluid to the high-gear clutch control means and the secondary regulator valve.

10. A control circuit for a fluid coupling means with a high-gear clutch, comprising:
    a fluid coupling means having a power chamber into which a working fluid is introduced for performing a transmission action between an input element and output element via the working fluid, a high-gear clutch arranged for the purpose of connecting and disconnecting the input and output elements
    , a working chamber formed separately of the power chamber, and a piston member displaced by a pressure differential between the working chamber and power chamber for engaging or disengaging the high-gear clutch;
    a fluid pressure source provided in order to supply the working fluid to the interior of the power chamber;
    a high-gear clutch control unit which supplies the working fluid to and discharges the fluid from the working chamber for controlling the engagement and disengagement of the high-gear clutch; and
    control means, responsive to the supply and discharge of the working fluid to and from the working chamber by said high-gear clutch control unit, reducing, upon the supply of the working fluid to the working chamber, a pressure $P_{t/c}$ internally of the power chamber which is supplied from the fluid pressure source to a hydraulic pressure proportional to a throttle pressure $P_{th}$ from a throttle valve;

said control means further including a secondary regulator valve which regulates a lubrication pressure of lubricant flowing out of the fluid coupling means and the power chamber pressure $P_{t/c}$ proportionally to the throttle pressure $P_{th}$;

said secondary regulator valve including a valve spool which is actuated by the throttle pressure $P_{th}$ and a thereto opposing pressure which is responsive to the working chamber fluid;

wherein said secondary regulator valve includes said spool having a plurality of lands, a chamber communicating with the power chamber, a pressure-regulating output port communicating with the power chamber and a pressure regulating output port of a primary regulator valve, an oil chamber at one end for introducing the throttle pressure $P_{th}$, and an oil chamber at the other end communicating with the working chamber, a spring for urging said spool toward the oil chamber communicating with said working chamber being arranged between said two oil chambers; and wherein the power chamber pressure $P_{t/c}$ is regulated in dependence upon the throttle pressure $P_{th}$ acting upon said spool, spring urging force and the working chamber pressure; and the control circuit further including a connecting line which communicates said working chamber to a chamber in the secondary regulator valve receiving said opposing pressure responsive to the fluid supply to the working chamber.

* * * * *